(12) United States Patent
Liao et al.

(10) Patent No.: US 9,449,075 B2
(45) Date of Patent: Sep. 20, 2016

(54) GUIDED SEARCH BASED ON QUERY MODEL

(75) Inventors: Jian Liao, Hangzhou (CN); Feng Lin, Hangzhou (CN); Shousong Zhang, Hangzhou (CN); Qin Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 349 days.

(21) Appl. No.: 12/932,868

(22) Filed: Mar. 8, 2011

(65) Prior Publication Data
US 2011/0225180 A1    Sep. 15, 2011

(30) Foreign Application Priority Data
Mar. 10, 2010    (CN) .......................... 2010 1 0123209

(51) Int. Cl.
*G06F 17/30* (2006.01)
(52) U.S. Cl.
CPC ................. *G06F 17/3064* (2013.01)
(58) Field of Classification Search
CPC .................... G06F 17/30864; G06F 17/30867
USPC ........................................................ 707/708
See application file for complete search history.

(56) References Cited

U.S. PATENT DOCUMENTS

| | | | |
|---|---|---|---|
| 7,519,529 B1 | 4/2009 | Horvitz | |
| 7,640,161 B2 | 12/2009 | Morris et al. | |
| 7,647,303 B2 | 1/2010 | Kudo | |
| 8,694,483 B2 | 4/2014 | Roulland et al. | |
| 2003/0115191 A1* | 6/2003 | Copperman | ...... G06F 17/30991 |
| 2004/0167770 A1 | 8/2004 | Zhou et al. | |
| 2006/0253427 A1 | 11/2006 | Wu et al. | |
| 2007/0038621 A1 | 2/2007 | Weyand et al. | |
| 2008/0005075 A1* | 1/2008 | Horvitz | ............. G06F 17/30864 |
| 2008/0263019 A1 | 10/2008 | Harrison et al. | |
| 2009/0063130 A1 | 3/2009 | Moore | |
| 2009/0248669 A1 | 10/2009 | Shetti et al. | |
| 2010/0138402 A1 | 6/2010 | Burroughs et al. | |
| 2010/0286979 A1* | 11/2010 | Zangvil | ................. G06F 17/273 704/9 |
| 2011/0078140 A1 | 3/2011 | Dube et al. | |

* cited by examiner

*Primary Examiner* — Belix M Ortiz Ditren
(74) *Attorney, Agent, or Firm* — Van Pelt, Yi & James LLP (57) ABSTRACT

Providing guided search includes: receiving a new query; processing the new query to obtain a plurality of models, wherein a model indicates a mapping relationship of a previously stored query and corresponding guidance information; determining a corresponding plurality of similarities of the plurality of models relative to the new query; obtaining guidance information in a database comprising a plurality of mapping relationships of previously stored query and corresponding guidance information, including selecting at least some of the plurality of models based at least in part on the similarities and using the selected models as index to search the database; and sending the obtained guidance information to be displayed to a user.

17 Claims, 7 Drawing Sheets

GUIDED SEARCH BASED ON QUERY MODEL

CROSS REFERENCE TO OTHER APPLICATIONS

This application claims priority to People's Republic of China Patent Application No. 201010123209.9 entitled METHOD FOR IMPLEMENTING GUIDED SEARCH, GUIDED SEARCH SERVER AND INFORMATION PROCESSING SYSTEM filed Mar. 10, 2010 which is incorporated herein by reference for all purposes.

FIELD OF INVENTION

The present invention relates to the technology of information processing and in particular to guided searches.

BACKGROUND OF THE INVENTION

In existing guided search systems, a user typically inputs at a client some text as a query to obtain information related to the input text. After obtaining the text provided from the client, a guided search server analyzes the text, identifies a query intention of the user, provides the client with the information related to the text input by the user, and narrows a query scope of the user to enable the user to retrieve information that he requires.

Currently, the guided search server generally pre-stores a mapping table of mapping relationships between query information and guidance information. For example, the query information is the text that the user inputs at the client and the guidance information is the information related to the text that the user inputs. After obtaining query information, the guided search server searches the mapping table for guidance information corresponding to the query information and transmits the retrieved guidance information corresponding to the query information to the client if the guidance information is retrieved from the mapping table.

In existing guided search systems, the guided search server typically retrieves the guidance information corresponding to the query information that the user inputs from the mapping table and transmits the retrieved guidance information to the client only if the query information that the user inputs completely matches with the query information in the mapping table. If the query information that the user inputs is not consistent with any query information in the mapping table, then the guided search server typically cannot retrieve any guidance information corresponding to the query information that the user inputs from the mapping table. Consequently, in the existing guided search, the guided search server typically cannot provide the client with any guidance information corresponding to query information that is absent in the mapping table.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Guided search techniques are described. In various embodiments, one or more models indicating mapping relationships of previously stored queries and corresponding guidance information are derived based on a new query. Similarities of the generated models and the new query are determined to facilitate the retrieval of guidance information.

Figure 1:
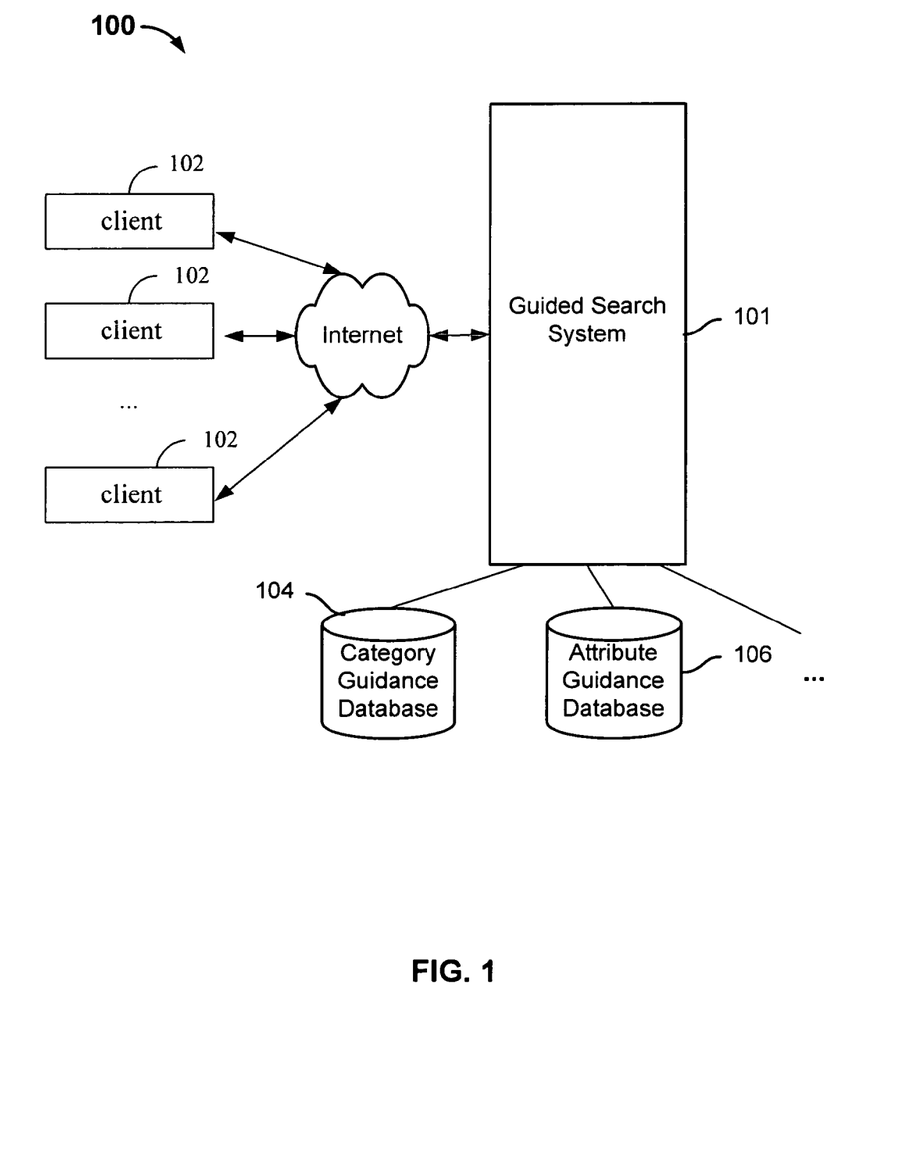
FIG. 1 is a schematic diagram illustrating an embodiment of a network environment that implements the guided search technique.

FIG. 1 is a schematic diagram illustrating an embodiment of a network environment that implements the guided search technique.

Users enter their search queries into clients 102, which interact with a guided search system 101, via a network such as the Internet, to perform a search. In various embodiments, the clients and the guided search systems may be implemented using any appropriate computing devices such as a personal computer, a server computer, a handheld or portable device such as a smart phone, a flat panel device, a multi-processor system, a microprocessor based system, a set-top box, a programmable consumer electronic device, a network PC, a minicomputer, a large-scale computer, a special purpose device, a distributed computing environment including any of the foregoing systems or devices, or other hardware/software/firmware combination that includes one or more processors, and memory coupled to the processors and configured to provide the processors with instructions.

The query information may include an element comprising one or more alphanumeric strings, symbols, etc. For example, in a practical application, the environment is an e-commerce platform and the query information may include the name and attributes of a product the user is interested in.

The guided search system searches for guidance information based on the query information and presents the retrieved guidance information to the clients for display to the user. Details of how to obtain the guidance information are described below.

As used herein, the guidance information refers to information that helps the user more quickly and more accurately retrieve desired information. In various embodiments, the guidance information comprises category based guidance information (e.g., "electronics", "health care", etc.), attribute based guidance information (e.g., "red", "rechargeable batteries included"), etc. For purposes of illustration, category based guidance information is discussed extensively in the examples below, but the technique described can also be applied to attribute based guidance information or other types of guidance information.

In some embodiments, the correspondence relationships between queries and their respective guidance information are stored in a guidance information database such as category guidance database 104 or attribute guidance database 106 (shown as separate databases in the example but may be combined in other implementations). The correspondence relationships may be established based on historical information (for example, records of previous user queries and the resulting categories selected by the users), system configuration (for example, mappings of query information and corresponding categories set up by system administrators), or any other appropriate techniques. The mapping relationship between the queries and the guidance information is referred to as a model. In some embodiments, a confidence level is used to measure the strength of the relationship, i.e., how likely that a particular query is intended to map to a particular category, attribute, etc. specified by the guidance information.

For example, an e-commerce site offers for sale a mobile phone by Nokia with a product model of "N95" and a face mask by 3M with the same product model. The guidance information database therefore maps the query of "N95" to categories such as "Mobile Phone", "Electronics", and "Health & Medical". The guidance information database may also map the query to attributes such as "Nokia" and "3M" (brands).

In some embodiments, multiple pieces of guidance information are presented to the user, who makes a selection to search for the item requested. For example, a user who entered a query for "N95" may be given the category guidance choices of "Mobile Phone", "Electronics", and "Health & Medical". The user selects the category that is deemed to be the most representative of his intentions to complete the search. For example, a search engine may combine the selected category information and the original query to locate the product(s) of interest.

Figure 2:
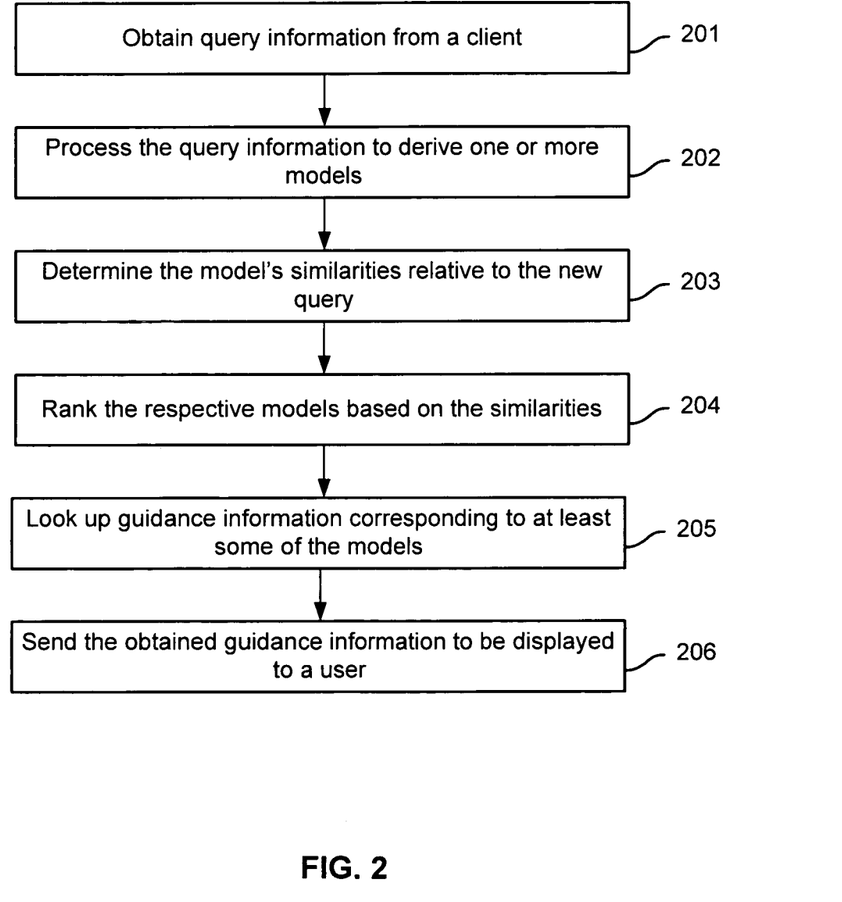
FIG. 2 is a flowchart illustrating an embodiment of a process for performing a guided search.

FIG. 2 is a flowchart illustrating an embodiment of a process for performing a guided search. Process 200 may be performed by a guided search system such as 100 of FIG. 1.

At 201, query information entered by a user is obtained from a client. In various embodiments, the query information may include a plurality of words, phrases, and/or symbols.

At 202, the query information is processed to derive one or more models.

In some embodiments, natural language processing techniques are used to process the query information and derive the models. Examples of techniques for processing the query information to obtain the model include syntax analysis, N-Grams (e.g., deriving a phrase with N words based on the query information), Skip-Grams (e.g., deriving a phrase with skipped words based on the query information), etc.

In some embodiments, the guided search server analyzes the query information using multiple processing techniques to derive several models. A model includes information extracted from and/or transformed based on the query information that characterizes the query information. Depending on the extraction technique employed, the model may comprise portions of the query information and/or translated query information. For example, the query information of "car MP3 player with FM transmitter" may result in models such as "car MP3 player", "car player", and "FM transmitter" that comprise portions of the query string. As another example, the same query may result in a translated model of "car audio equipment".

At 203, the models' similarities with respect to the query are determined. A similarity score of a model represents the extent to which the model is similar to the query information. The similarities may be computed based on the properties of the model words and/or skipped words (e.g., part of speech, word distances, etc.). In some embodiments, the similarity score of a model is calculated based at least in part on the words that are skipped in generating the model. Each skipped word leads to a penalty score. The sum of all the penalty scores of the skipped words is computed to calculate the similarity score. A number of similarity calculation techniques may be employed in various implementations, an example of which is given below.

At 204, the guided search server ranks the respective models based on the computed similarities. The respective models may be ranked in a descending or ascending order of the similarities. In some embodiments, this step is optionally omitted and a selection is made based on the similarities.

Taking the query information of "car MP3 player with FM transmitter 911" as an example, it is assumed that the following models are obtained: "player" (a central word), "MP3 player" (a central phrase), "car MP3 player" (a phrase with a specified length of 3), and "car MP3 player with transmitter" (a word-skipping phrase). Each model is associated with a similarity score. In this example, the higher the score is, the more similar the model is to the original query. The models, ranked according to a descending order of the scores, are "car MP3 player with transmitter", "car MP3 player", "MP3 player", and "player".

At 205, guidance information corresponding to at least some of the models is looked up in a database. For example, a table mapping queries and search results (e.g. categories) may be looked up using the model as a search keyword. In some embodiments, the guided search server ranks the respective models in a descending order of the similarities. In this case, the guided search server can search the database for guidance information corresponding to highest-ranked one of the models by using the first model in the ranked list as a keyword. If guidance information corresponding to the first model in the ranked list is retrieved, then the guided search server can transmit the retrieved guidance information corresponding to the first-ranked model to the client; otherwise, the guided search server can search the database for guidance information corresponding to second model in the ranked list as a keyword, and so on, until it retrieves guidance information corresponding to one of the models or until it searches the database for guidance information corresponding to all of the models.

Taking the query information of "car MP3 player with FM transmitter 911" as an example, it is assumed that the guided search server extracts the models of "player" (a central word), "MP3 player" (a central phrase), "car MP3 player" (a phrase with a specified length), and "car MP3 player with transmitter" (a word-skipping phrase). It is assumed that the similarity is represented with a score; the guided search server has calculated scores for the respective models, and the models in a descending order of the scores are "car MP3 player with transmitter", "car MP3 player", "MP3 player", and "player" respectively. Thus, the guided search server ranks the models of "car MP3 player with transmitter", "car MP3 player", "MP3 player", and "player" in a descending order of the scores. Thereafter, the guided search server first searches the mapping table for a category (guidance information) corresponding to "car MP3 player with transmitter" using "car MP3 player with transmitter" as an index/keyword and terminates searching if the corresponding category is retrieved. Otherwise, it searches the mapping table for guidance information (e.g., a category) corresponding to "car MP3 player" using "car MP3 player" as a keyword and terminates searching if the corresponding category is retrieved. Otherwise, it searches the mapping table for a category (guidance information) corresponding to "MP3 player" using "MP3 player" as a keyword and terminates searching if the corresponding category is retrieved. Otherwise, it searches the mapping table for a category (guidance information) corresponding to "player" using "player" as a keyword and terminates searching if the corresponding category is retrieved. Otherwise, no corresponding category is retrieved from the mapping table for the query information of "car MP3 player with FM transmitter 911".

In another example, the guided search server can search for guidance information corresponding to several of the models with relatively high similarities, that is, it can search from the mapping table for guidance information corresponding to several models with relatively high similarities regardless of whether guidance information corresponding to one of the models with the highest similarity is retrieved from the mapping table.

At 206, the retrieved guidance information is sent to the client for displaying to the user. The guidance information may be displayed in a prompt associated with a search entry box, in a display area of the client's browser, or in any other appropriate format such that a further user selection can be made based on the guidance information provided.

In various embodiments, the guided search server can transmit the retrieved guidance information to the client by different ways under different conditions. In some embodiments, the mapping table records include confidence levels of query information with guidance information, which represent the extent of the association between the query information and the guidance information. Such a confidence can be represented with a probability or score or in another form. The higher the confidence score, the greater extent to which the query information is associated with the guidance information. If the guided search server retrieves several pieces of guidance information corresponding to a certain model, it can transmit the guidance information with the highest confidence to the client or rank the pieces of guidance information in a sequential order of the confidences and transmit the respective pieces of guidance information to the client in the order of ranking.

Still taking the query information of "car MP3 player with FM transmitter" as an example, if the guided search server retrieves two categories of "Music Player" and "Electronic Product" and their respective confidences are 90% and 10% with "car MP3 player with FM transmitter" from the mapping table using the model of "car MP3 player with FM transmitter" as an index, depending on implementation, the server may transmit only the category of "Music Player" to the client or rank "Player" as more important than "Electronic Product" and transmit both "Player" and "Electronic Product" to the client.

In some embodiments, a query result is returned to the client according to the combination of a similarity and a confidence. For example, after obtaining the query information, the guided search server analyzes the query information to derive a plurality of models, calculates similarities of the respective models and ranks the models according to the similarities. Thereafter, it first searches the mapping table for guidance information corresponding to the first-ranked one of the models using the first-ranked model as a keyword. Then if a plurality of pieces of guidance information corresponding to the first-ranked model and their respective confidences with the first-ranked model are retrieved, then it transmits one of the pieces of guidance information with the highest confidence to the client.

Figure 3:
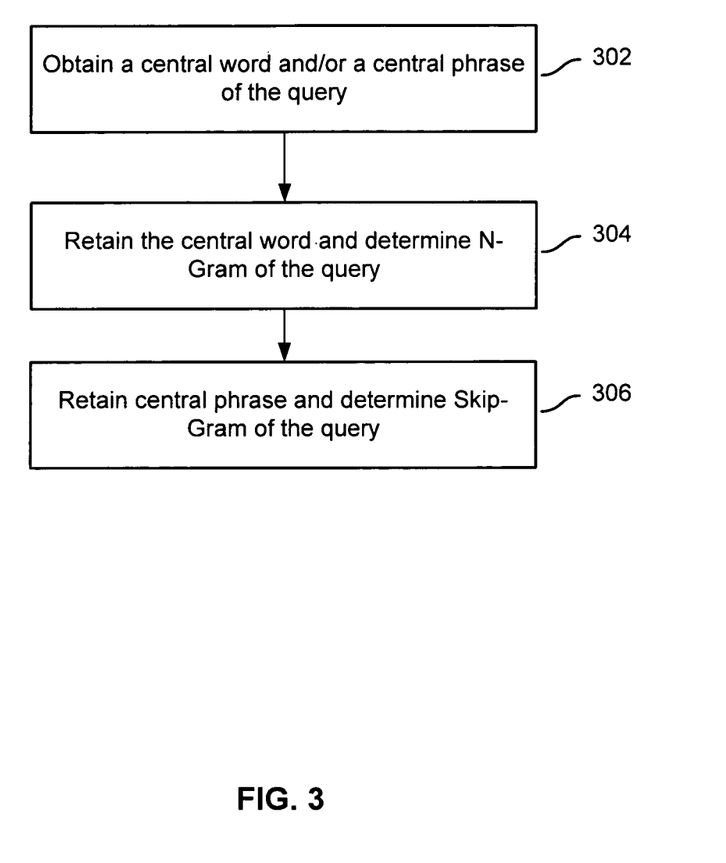
FIG. 3 is a flowchart illustrating an embodiment of a process for deriving one or more models based on query information.

FIG. 3 is a flowchart illustrating an embodiment of a process for deriving one or more models based on query information. Process 300 may be used to implement 202 of process 200.

At 302, a central word and a central phrase comprising one or more words are extracted. The central word and the central phrase are extracted from the query based on syntax analysis and grammatical rules. The central word and central phrase convey the essential meaning of the query information. Taking the query of "car MP3 player with FM transmitter" as an example, syntax analysis reveals that the central word is "player", and the central phrase is "MP3 player" or "car MP3 player".

At 304, N-Gram is performed on the query based on the central word. In other words, the central word in the query is retained and N sequential words are extracted from the query. In some embodiments, N of 2 is used. For example, the query of "car MP3 player with FM transmitter" with the central word of "player" results in 2-Gram of "MP3 player" and "player with".

At 306, the central phrase is retained and Skip-Grams are extracted (based on ROUGE evaluation metrics). One or more phrases with a skip distance k relative to the central phrase are extracted from the query information. The skip distance k, which may be preconfigured, allows a total of k or less skips to construct the N-Gram. Take the query of "car MP3 player with FM transmitter" as an example, if "car MP3 player" is the central phrase that is retained and the skip distance is 1, "with", "FM", and "transmitter" can be skipped to obtain "car MP3 player FM transmitter", "car MP3 player with transmitter", or "car MP3 player with FM".

Figure 4:
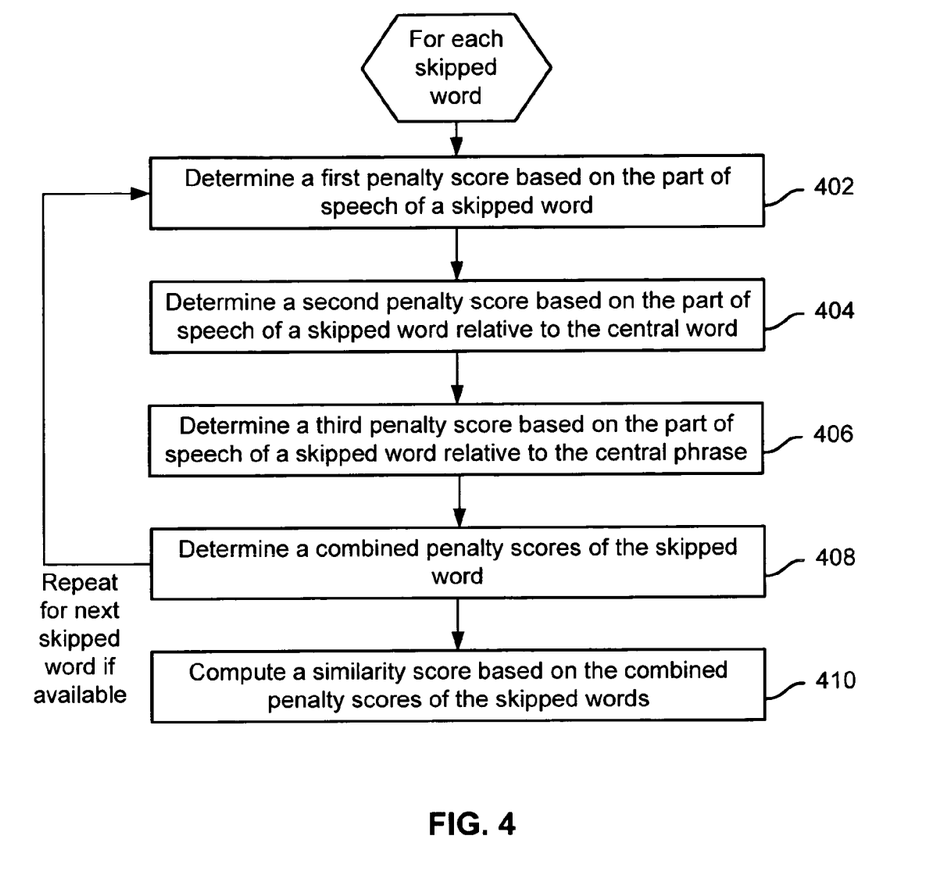
FIG. 4 is a flowchart illustrating an embodiment of a process to compute the similarity score of a model.

FIG. 4 is a flowchart illustrating an embodiment of a process to compute the similarity score of a model. Process 400 may be used to implement 203.

In 402-408, penalty scores associated with each skipped word in the model relative to the original query are determined.

At 402, a first penalty score of the skipped word is determined based on the part of speech of the skipped word. The part of speech of a skipped word in the model relative to the original query is determined using, for example, lexical analysis techniques. In some embodiments, each part of speech is pre-assigned a penalty score $f_{pos}$. In one example, adverb, adjective, numeral, verb, and noun have pre-assigned scores of 0.2, 0.4, 0.6, 0.8, and 1, respectively. Other pre-assignment values may be used in different embodiments. The first penalty score of the skipped word is determined based on the pre-assignment associated with the part of speech of the skipped word.

At 404, a second penalty score is determined based on the distance of the skipped word relative to the central word in the original query information.

At 406, a third penalty score is determined based on the distance of the skipped word relative to the central phrase in the original query.

In 404 and 406, a variety of distance formulas may be used depending on implementation. Some examples are described in detail below.

At 408, a combination of the computed penalty scores for the skipped word is determined. In some embodiments, an average of the scores is determined for the skipped word. In some embodiments, a weighted average of the score is used. Other combinations may be used as appropriate.

Steps 402-408 may be repeated for all the skipped words to obtain their respective scores. The steps may occur in different order than what is illustrated in the example. Although serial processing is shown in the example, the steps may also be repeated in parallel.

At 410, when the combined scores associated with all the skipped words are determined, the similarity score of the model is computed based on the combined penalty scores. In this example, a sum of the penalty scores is used to determine the query information.

The above process is illustrated using an example where an original query comprises six words "w1 w2 w3 w4 w5 w6".

Assume that a model of "w3 w5 w6" is obtained using the techniques previously described, the query has a central phrase of "w4 w5 w6", and a central word of "w6". Thus, to obtain the model, "w1", "w2", and "w4" are skipped relative to the original query information of "w1 w2 w3 w4 w5 w6".

The penalty scores are determined for skipped words "w1", "w2", and "w4".

At 402, the first penalty score based on the part of speech of skipped word "w1" is calculated. In this example, w1 is an adverb. Based on the example mapping of parts of speech to pre-assigned score described above, an adverb results in a corresponding score of 0.2.

At 404, the second penalty score based on the distance between the location of a skipped word in query information and the location of a central word in the query information is calculated using the formula of $f_{dw}=1-(d-1)*\lambda$, where d represents the distance between the location of the skipped word in the query and the location of the central word in the query and $\lambda$ represents a weight of $f_{dw}$ among $f_{pos}$, $f_{dw}$, and $f_{dp}$. For w1, the distance between the location of w1 in the query information and the location of w6 (the central word) in the query information is 5, $\lambda$ is assumed as 0.0002, and, in this case, $f_{dw}=1-(d-1)*\lambda=1-(5-1)*0.0002=0.9992$.

At 406, the third penalty score based on the distance between the location of a skipped word in query and the location of a central phrase in the query information is calculated using the formula of $f_{dp}=1-d*\lambda$, where d represents the distance between the location of the skipped word in the query information and the location of the middle word of the central phrase in the query information (in some embodiments, d is rounded if the central phrase has an even number of words) and $\lambda$ represents a weight of $f_{dp}$ among $f_{pos}$, $f_{dw}$, and $f_{dp}$. In some embodiments, the score of the distance between the location of the skipped word in the query information and the location of the central phrase in the query information is determined by calculating the difference between the location of the last word of the central phrase in the query information and the location of the first word of the central phrase in the query information, dividing the difference by two and rounding up the divided result into an integer, adding the location of the first word in the central phrase to the integer, subtracting therefrom the location of the skipped word in the query information, and finally taking an absolute value thereof. For w1, the distance between the location of w1 in the query information and the location of w5 (the middle word of the central phrase) in the query information is 4 and $\lambda$ is assumed as 0.0001. Accordingly, $f_{dp}=1-d*\lambda=1-4*0.0001=0.9996$.

In this example, a combined score of a skipped word is calculated using the formula of $score=(f_{pos}+f_{dw}+f_{dp})/3$. Thus, the score of the query with skipped word "w1" is score $1=(0.2+0.9992+0.9996)/3=0.7329$.

Steps 402-408 are repeated to calculate the combined score of the skipped word "w2".

It is assumed that w2 is a noun with a part of speech score $f_{pos}$ of 1.

The distance between the location of w2 in the query information and the location of w6 (a central word) in the query information is 4, $\lambda$ is assumed as 0.0002, and, in this case, $f_{dw}=1-(d-1)*\lambda=1-(4-1)*0.0002=0.9994$.

The distance between the location of w2 in the query information and the location of w5 (a central word of the central phrase) in the query information is 3, $\lambda$ is assumed as 0.0001, and, in this case, $f_{dp}=1-d*\lambda=1-3*0.0001=0.9997$.

The combination score of the skipped word "w2" is therefore $(1+0.9994+0.9997)/3=0.9997$.

Steps 402-408 are repeated to calculate the combination score of the skipped word "w4".

It is assumed that w4 is a numeral, which has a part of speech based score $f_{pos}=0$.

The distance between the location of w4 in the query information and the location of w6 (a central word) in the query information is 2, $\lambda$ is assumed as 0.0002, and, in this case, $f_{dw}=1-(d-1)*\lambda=1-(2-1)*0.0002=0.9998$.

The distance between the location of w4 in the query information and the location of w5 (the central word of a central phrase) in the query information is 1, $\lambda$ is assumed as 0.0001, and, in this case, $f_{dp}=1-d*\lambda=1-1*0.0001=0.9999$.

The combined score of skipped word "w4" is $(0.6+0.9998+0.9999)/3=0.8666$.

At 410, the similarity score of the model "w3 w4 w6" is therefore $0.7329+0.9997+0.8666=2.5992$.

Process 400 may be repeated to obtain the similarity scores of all the models.

The similarities of the respective models may be obtained in other ways. For example, the number of words skipped from a model relative to the query information can be calculated and the score can be incremented by one for each skipped word, thus the higher the score is, the lower the similarity will be. The other ways in which the similarities of the respective models are calculated will not be enumerated here as an example.

In some embodiments, the guidance information is sent to the user based at least in part on its confidence level. In various embodiments, the confidence level can be calculated in different ways. For example, a confidence level can be specified manually. In other words, the confidences in the mapping table can be configured manually. In another example, the guided search server retrieves a historical record in which query information and corresponding guidance information is recorded. The historical record can be stored in a database server separate from the guided search server, and the guided search server can retrieve the historical record from the database server when the historical record is required. Alternatively, the historical record can be stored in the guided search server, and the guided search server can directly retrieve the historical record locally when the historical record is required. For example, the historical record records the number of times that the query information and the corresponding guidance information occur concurrently in searches, the number of times that the query information occurs alone, the number of times that the corresponding guidance information occurs alone, etc. The determination of the values is described in greater detail below. If the guided search server or another server further obtains user selected guidance information from the client, then the guided search server or another server can determine the correspondence of the query information to the guidance information. For the respective pieces of query information in the historical record, the guided search server calculates the conditional probabilities of the query information with the respective corresponding pieces of guidance information as the confidence of the query information with the corresponding guidance information.

In some embodiments, the historical record records direct correspondence between a piece of query information and a piece of guidance information and also correspondence between the query information and intermediate information, where the intermediate information corresponds to the query information and the guidance information but the query information and the guidance information do not have direct correspondence with each other. As used herein, the intermediate information refers to the same information to which certain query information and the guidance information both map directly and by which an indirect correspondence relationship can be created between the query information and the guidance information. For example, it is assumed that query information corresponds to some specific information and guidance information corresponds to the same information, and therefore the query information corresponds to the guidance information. The ratio of the number of times that the query information and the guidance information occur concurrently to the total number of times that the query information occurs is calculated. This probability is referred to as a conditional probability A. Alternatively, the guided search server calculates the ratio of the number of times that the query information and the intermediate information occur concurrently to the total number of times that the query information occurs. This ratio is referred to as a conditional probability B. Thereafter, the guided search server calculates the product of the conditional probability A and a weight corresponding to the conditional probability A and the product of the conditional probability B and a weight corresponding to the conditional probability B and sums up the two products to as the conditional probability of the query information with the guidance information. The weight corresponding to the conditional probability A and the weight corresponding to the conditional probability B can be determined from empirical data or in a linear regression method.

Also taking category based guidance information as an example, descriptions will be presented below of how to determine the confidence of query information with guidance information.

If a user inputs query information, $query_i$, which has a corresponding set of categories $\{category_1, category_2, \ldots category_j \ldots \}$ in a category guidance database, then a conditional probability of $query_i$ with $category_j$ is defined as $p(category_j|query_i)$. The condition $$\sum_j p(category_j \mid query_i) = 1$$

is satisfied for the respective categories.

In response to the presented search results, a user may select a category in the guidance information presented or select other information instead of the category. Moreover, since there is also possibly a correspondence relationship between the other selected information and the category, for example, the other information pertains to a product belonging to a category, the other selected information is intermediate information that indirectly maps the query and the guidance information. The guided search server or another server can be preconfigured with a mapping table in which mapping relationships between the other information and the categories are recorded. The mapping table can be further updated in real time. Therefore, even if the user selects other intermediate information instead of a category after inputting the query information, the guided search server or another server can determine a correspondence relationship between the query information and the category. The other selected information is intermediate information. Therefore, when the conditional probability of $query_i$ with $category_j$ is calculated, both direct and indirect correspondence between the query information and the category may be taken into account.

In an embodiment, the number of times that $query_i$ and $category_j$ occur concurrently in historical data is determined. If the user inputs $query_i$ and further selects $category_j$, then the recoded number of times that $query_i$ and $category_j$ occurs concurrently is incremented by one. The guided search server further retrieves the total number of times $query_i$ occurs, which refers to the total number of times that the respective users input $query_i$ in the search system. The guided search server calculates the conditional probability of $query_i$ corresponding directly to $category_j$ as:

$$p'(category_j \mid query_i) = \frac{\text{count}(category_j, query_i)}{\text{count}(query_i)}$$

Where count($category_j$,$query_i$) represents the number of times that $query_i$ and $category_j$ occurs concurrently, and count($query_i$) represents the total number of times that the respective users input $query_i$.

In some embodiments, after retrieving the historical record, the guided search server can further retrieve the mapping table in which mapping relationships between intermediate information and categories are recorded. The mapping table can be stored in a database server or the guided search server. The guided search server retrieves the respective intermediate information corresponding to the category of category$_j$ after retrieving the mapping table. Thereafter, it retrieves from the historical record the numbers of times that query$_i$ and the respective intermediate information occurs concurrently. If the user inputs query$_i$ and further clicks on specific intermediate information (e.g., information on other products rather than a category that corresponds directly to the query), then the recoded number of times that query$_i$ and the intermediate information occurs concurrently is incremented by one. Moreover, the guided search server further retrieves the total number of times that query$_i$ occurs. In this case, the guided search server calculates the conditional probability of query$_i$ corresponding indirectly to the intermediate information as:

$$p''(category_j \mid query_i, \text{offer}) = \frac{count(category_j, query_i \mid \text{offer})}{count(query_i \mid \text{offer})}$$

Where count(category$_j$, query$_i$|offer) represents the number of times that query$_i$ and intermediate information occurs concurrently, intermediate information represents all of intermediate information corresponding to the category and count(query$_i$|offer) represents the total number of times that query$_i$ occurs.

The foregoing two derived conditional probabilities are weighted linearly to derive the confidence of query$_i$ with category$_j$:

$p(category_j|query_i) = \lambda_1 p'(category_j|query_i) + \lambda_2 p''(category_j|query_i,\text{offer})$ where $\lambda_1$ and $\lambda_2$ represent weights that can be determined empirically or using a linear regression technique.

It shall be noted that the embodiment of the method illustrated in Process 200 is only an embodiment of the invention and that those skilled in the art can derive other variations.

In some embodiments, after the step 201 is performed, the guided search server first searches the mapping table, in which mapping relationships between query information and guidance information are recorded, for guidance information corresponding to the obtained query information using the obtained query information as a keyword and transmits the retrieved guidance information directly to the client if the guidance information is present or otherwise further perform the step 202. Moreover, if a plurality of pieces of guidance information corresponding to the query information are retrieved from the mapping table and confidences of the query information with the respective guidance information are recorded in the mapping table, then only one of the pieces of guidance information with the highest confidence is transmitted to the client.

In some embodiments, the guided search server updates in real time or periodically the mapping relationships and the confidences in the mapping table to thereby further improve accuracy of a query about guidance information.

In some embodiments, in the case that the query information is a single letter, number, symbol, or abbreviated phrase, the guided search server can convert such query information into at least a model in semantic translation mode. For example, it is assumed that the guided search server obtains the query information of "LV" and then the guided search server can translate "LV" into "LOUIS VUITTON". For convenience of an implementation, the guided search server can pre-store a mapping table, in which mapping relationships between query information and converted information are recorded, and search the mapping table for converted information using such query information as a keyword after obtaining the query information. Moreover, the mapping table can also record confidences of query information with converted information in addition to their mapping relationships between query information and converted information. In this case, if the guided search server retrieves a plurality of pieces of converted information to the query information from the mapping table, then the guided search server can select one of the pieces of converted information with the highest confidence as a model.

In some embodiments, if the guided search server derives guidance information corresponding to query information using a model, then the guided search server can record a mapping relationship between the obtained query information and the derived guidance information in the mapping table in which mapping relationships between query information and guidance information are recorded. If it further calculates the confidence of the obtained query information with the derived guidance information, then it can further record the confidence in the mapping table. Thus, after obtaining the same query information, the guided search server can retrieve the corresponding guidance information directly from the mapping table in which mapping relationships between query information and guidance information are recorded and select the guidance information to be transmitted to the client by the confidence.

In some embodiments, if the guided search server retrieves a plurality of pieces of guidance information corresponding to query information using models and also the confidences of the respective models with their corresponding guidance information, then the guided search server can calculate the respective confidences of the obtained query information with the guidance information corresponding to the models. Specifically, if the guided search server determines that specific retrieved guidance information corresponds to only one model, then the guided search server can take the confidence of the model with the guidance information as the confidence of the obtained query information with the guidance information. If the guided search server determines that specific retrieved guidance information corresponds to a plurality of models, that is, there are a plurality of models each corresponding to the same guidance information, then the guided search server can add up the confidences of the guidance information with the respective models and average the added result as the confidence Of the obtained query information with the guidance information.

In some embodiments, if the guided search server derives only a model, then the guided search server searches the mapping table for guidance information corresponding to the model using the model as a keyword/index, i.e., using the model as new query information. If the model is not recorded in the mapping table, then the guided search server cannot retrieve any guidance information corresponding to the model; and if guidance information corresponding to the model is recorded in the mapping table, then the guided search server can retrieve the guidance information corresponding to the model.

In some embodiments, if the guided search server retrieves no guidance information corresponding to any model, then the guided search server can predict guidance information corresponding to the query information in a machine learning mode.

In the machine learning mode, a probability distribution that a feature of obtained query information belongs to specific guidance information can be calculated through learning and training of historical query information. For example, the feature of the query information may be the label of a product, the label of a brand, the label of a model, a central word, a corpora of noun phrases, a central word and a noun phrase left adjacent thereto, a central word and a noun phrase right adjacent thereto, etc.

Specifically, it is assumed that a category is the category C, and then the confidence that current query information is categorized into the category C can be represented as follows: the posteriori probability p(c is correct|x) that the current query information is determined to belong to the category C under a condition of giving relevant information x, where x represents the given information, for example, the label of a product, the label of a brand, the label of a model, a central word, a corpora of noun phrases, a central word and a noun phrase left adjacent thereto, a central word and a noun phrase right adjacent thereto, etc., extracted from the current query information. The label of a product indicates that the current query information is specific product information, which is derived by semantic identification. The label of a brand indicates that the current query information is specific brand information, which is derived by semantic identification. The label of a model indicates that the current query information is specific model information, which is derived by semantic identification.

The weights of features derived from current query information can be trained in a conditional probability model, and the conditional probability that the current query information is determined as a specific category can be calculated in the conditional probability model using the corresponding feature values and weights derived from training.

Preferably, the maximum entropy model in the following formula is selected as the conditional probability model:

$$p(y \mid x) = \frac{1}{Z(x)} \exp\left(\sum_j \lambda_j f_j(x, y)\right)$$

Where y∈{c is correct,c is incorrect}; x represents the given information corresponding to the current query information, such as the label of a product, the label of a brand, the label of a model, a central word, a corpora of noun phrases, a central word and a noun phrase left adjacent thereto, a central word and a noun phrase right adjacent thereto, etc.; $f_j$ represents a feature value corresponding to the maximum entropy model, for example, when x represents a word-level feature, if "when the keywords of the current query information include 'phon', the current query information belongs to the category C" can be matched among trained data, then the feature $f_j$ takes the value of 1 under the condition of "the keyword of the current query information includes phon" or otherwise takes the value of 0; $\lambda_j$ represents weights corresponding to the respective features of the current query information and can be derived from the model training; and Z(x) represents a normalization factor which can also be derived from the model training.

In some embodiments, the conditional probability model is created from a machine learning model, e.g., linear regression, etc. In some implementations, a support vector machine model can alternatively be adopted, which can also be used instead of the conditional probability model to calculate a score as a confidence representing the extent of association between query information and a category.

In some embodiments, categories may be divided into a plurality of levels, and therefore a multi-level classifier may be adopted. For example, it is assumed that "Vehicle" is a first-level category or referred to as a root category, categories at a next level to "Vehicle" include "Automobile", "Train", "Airplane", and "Ship", and categories at a next level to "Automobile" include "Car" and "Truck". In this case, the guided search server can first calculate the confidences of the query information with a plurality of or all of the root categories in a machine learning mode and thereafter calculate the confidences of the query information with categories at the next level to one of the root categories with the highest confidence, the confidences of the query information with categories at a further next level to the categories at the next level to the one of the root categories with the highest confidence, and so on.

After deriving the confidences of the query information with guidance information (e.g., categories) in the machine learning mode, the guided search server can transmit the guidance information with the highest confidence or a relatively high confidence to the client or transmit a plurality of pieces of guidance information in a sequential order of the confidences to the client. Selections of the guidance information for transmission from the guided search server to the client can be devised by those skilled in the art and will not be enumerated here as an example.

Of course, other embodiments can be derived by those skilled in the art from the descriptions of the embodiment of the method illustrated in FIG. 2 and will not be enumerated here as an example.

Figure 5:
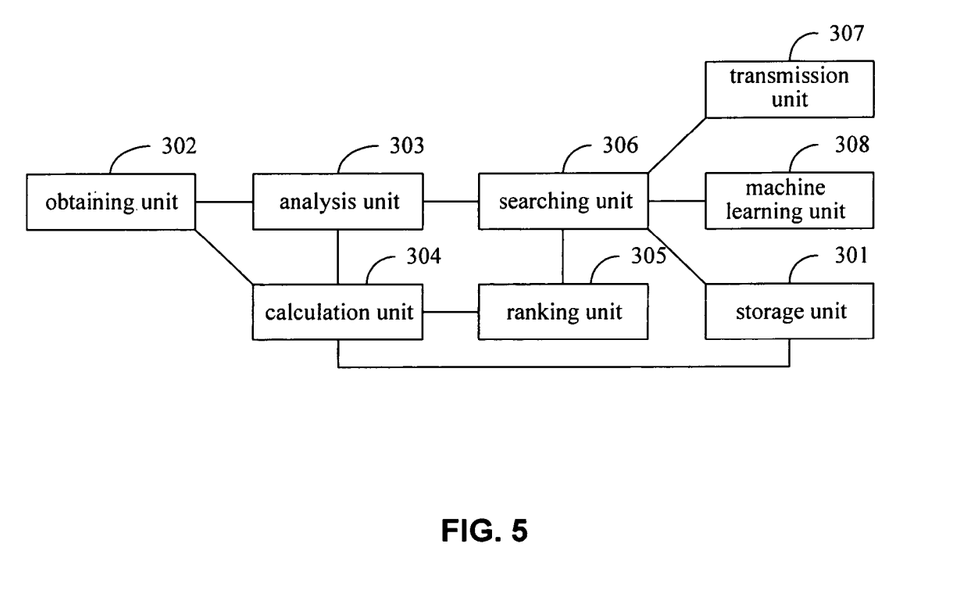
FIG. 5 is a block diagram illustrating an embodiment of a guided search server configured to implement process 200.

FIG. 5 is a block diagram illustrating an embodiment of a guided search server configured to implement process 200. In this example, guided search server includes: a storage unit 501 adapted to store a mapping table in which mapping relationships between query information and guidance information are stored; an obtaining unit 502 adapted to obtain query information provided from a client; an analysis unit 503 adapted to analyze the query information in a model extraction algorithm to derive at least a model which is information extracted from the query information or information obtained by implementing the semantic translation of the query information and which characterizes the query information; a calculation unit 504 adapted to calculate similarities of respective models which represent the extents to which the models are similar to the query information when the analysis unit 503 derive the models; a ranking unit 505 adapted to rank the respective models in a sequential order of the similarities; a searching unit 506 adapted to search the mapping table for guidance information corresponding to the respective models using the models as a keyword in the order of ranking; and a transmission unit 507 adapted to transmit the retrieved guidance information to the client.

The analysis unit 503 can particularly be adapted to extract a central word and/or a central phrase from the query information.

The analysis unit 503 can particularly be adapted to extract from the query information a phrase with a specified length including the central word or the central phrase.

For a model, the calculation unit 504 can particularly be adapted to calculate scores of the model skipped respective words relative to the query information and to calculate the sum of the scores as the similarity of the model.

The storage unit 501 can further store a mapping table in which mapping relationships between parts of speech and scores are stored. The calculation unit 504 can include: a determination sub-unit adapted to determine the part of speech of the skipped word; a searching sub-unit adapted to search the mapping table for a score corresponding to the part of speech of the word as a first score; a first calculation sub-unit adapted to calculate a score of the distance between the location of the word in the query information and the location of the central word in the query information as a second score; a second calculation sub-unit adapted to calculate a score of the distance between the location of the word in the query information and the location of the central phrase in the query information as a third score; and a third calculation sub-unit adapted to calculate a score of the model skipping the word relative to the query information from the first, second, and third scores in a preset score algorithm. In a practical application, those skilled in the art can devise various score algorithms as required in practice. For example, the average of the first, second, and third scores is calculated; for example, the average of any two of the scores is calculated; for example, the average of any two of the scores is calculated and then added to or multiplied with the remaining score; etc. Of course, other forms of score algorithms are also possible and will not be enumerated here as examples.

The searching unit 506 searches the mapping table for guidance information corresponding to the first-ranked one of the models using the first-ranked model as a keyword; if the searching unit 506 retrieves the guidance information corresponding to the first-ranked model, then the transmission unit 507 transmits the retrieved guidance information to the client; if the searching unit 506 retrieves no guidance information corresponding to the first-ranked model, then the searching unit 506 searches the mapping table for guidance information corresponding to the second-ranked one of the models using the second-ranked model as a keyword; repeat until the searching unit 506 retrieves guidance information corresponding to one of the models or searches the mapping table for guidance information corresponding to the respective models.

The mapping table can further record confidences of query information with guidance information, which represent the extents of the association between the query information and the guidance information; and if the searching unit 506 retrieves a plurality of pieces of guidance information corresponding to a model, then the transmission unit 507 transmits one of the pieces of retrieved guidance information with the highest confidence to the client or ranks the plurality of pieces of guidance information and then transmits them to the client.

The obtaining unit 502 further retrieves a historical record, in which query information and corresponding guidance information is recorded, before obtaining the query information provided from the client. In this case, for the respective pieces of query information in the historical record, the calculation unit 504 calculates the conditional probabilities of the query information with the respective corresponding pieces of guidance information as the confidences of the query information with the corresponding guidance information. The calculation unit 504 can store the confidences in the storage unit 501.

If the historical record records direct correspondence between a piece of query information and a piece of guidance information and also between the query information and intermediate information, then the calculation unit 504 can include: a fourth calculation unit adapted to calculate the ratio of the number of times that the query information and the guidance information occurs concurrently to the total number of times that the query information occurs as a conditional probability A; a fifth calculation unit adapted to calculate the ratio of the number of times that the query information and the intermediate information occurs concurrently to the total number of times that the query information occurs as a conditional probability B; and a sixth calculation unit adapted to calculate the product of the conditional probability A and a weight corresponding to the conditional probability A and the product of the conditional probability B and a weight corresponding to the conditional probability B, and to sum up the two products to derive the conditional probability of the query information with the guidance information.

The guided search server illustrated in FIG. 5 can further include a machine learning unit 508 adapted to be triggered by the searching unit 506 when the searching unit 506 retrieves no guidance information corresponding to any model to predict guidance information corresponding to the query information in a machine leaning mode:

Since the embodiment of the guided search server illustrated in FIG. 5 corresponds to the embodiment of the process illustrated in FIG. 2, reference can be made to the relevant descriptions in the embodiment of the method illustrated in FIG. 2 for details of functions and mutual cooperative relationships of the respective units in the guided search server illustrated in FIG. 5, and repeated descriptions thereof will be omitted here.

Since the guided search server can be deployed in an information processing system, an embodiment of the invention further includes an information processing system. As illustrated in FIG. 1, the information processing system includes a client 102 and a guided search server 101, where the client 102 is adapted to perform information interaction with the guided search server 101, and the guided search server 101 is adapted to obtain query information provided from the client 102; analyze the query information in a model extraction algorithm to derive at least a model which is information extracted from the query information or information obtained by implementing the semantic translation of the query information and which characterizes the query information; and if a plurality of models are derived, then calculate similarities of the respective models to represent the extents to which the models are similar to the query information, rank the respective models in a sequential order of the similarities, search a mapping table, in which mapping relationships between query information and guidance information are stored, for guidance information corresponding to the respective models using the models as a keyword in the order of ranking, and transmit the retrieved guidance information to the client 102.

Reference can be made to the relevant descriptions in the embodiment of the method illustrated in FIG. 2 and the embodiment of the guided search server illustrated in FIG. 5 for details of specific functions of the guided search server 101 and the client 102 as well as mutual cooperative relationships thereof, and repeated descriptions thereof will be omitted here.

Figure 6:
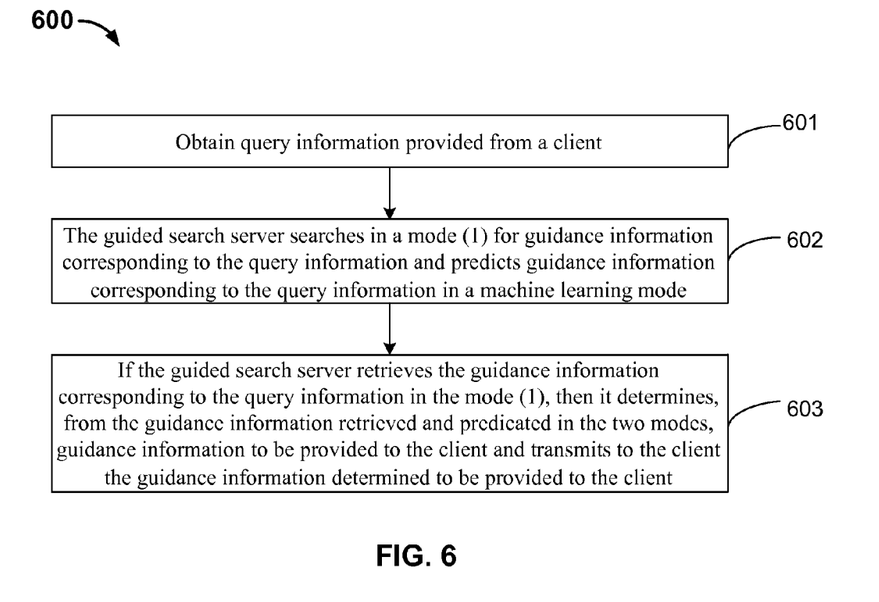
FIG. 6 is a flowchart illustrating another embodiment of a process for performing a guided search.

FIG. 6 is a flowchart illustrating another embodiment of a process for performing a guided search. Process 600 may be performed by a guided search system such as 100 of FIG. 1.

At 601, query information provided from a client is obtained. This step is similar to 201 of process 200.

At 602, the guided search server searches in a mode (1) for guidance information corresponding to the query information and predicts guidance information corresponding to the query information in a machine learning mode.

Particularly in the mode (1), the guided search server analyzes the query information to derive at least a model; and if a plurality of models are derived, then the guided search server calculates similarities of the respective models to represent the extent to which the models are similar to the query information; the guided search server ranks the respective models in a sequential order of the similarities; and the guided search server searches a mapping table, in which mapping relationships between query information and guidance information are stored, for guidance information corresponding to the respective models using the models as a keyword in the order of ranking.

Reference can be made to the relevant descriptions of steps 202-205 in the process 200 for details of the mode (1), and repeated descriptions thereof will be omitted here.

At 603, if the guided search server retrieves the guidance information corresponding to the query information in the mode (1), then it determines, from the guidance information retrieved and predicated in the two modes, guidance information to be provided to the client and transmits to the client the guidance information determined to be provided to the client.

In a practical application, the guided search server can determine guidance information to be provided to the client in different ways. For example, the same guidance information retrieved and predicated in the two modes is transmitted to the client. For example, all the guidance information retrieved and predicated in the respective modes is transmitted to the client. In another example, the guidance information with the highest confidence can be transmitted to the client in the confidence mode as described above. In a further example, a plurality of pieces of guidance information are ranked and then transmitted to the client.

Figure 7:
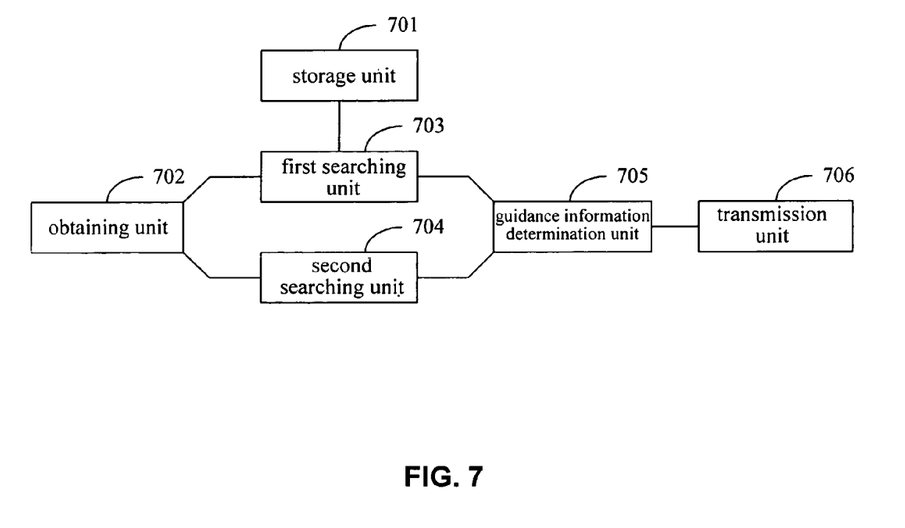
FIG. 7 is a block diagram illustrating an embodiment of a guided search server configured to implement process 600.

FIG. 7 is a block diagram illustrating an embodiment of a guided search server configured to implement process 600. In this example, the guided search server includes: a storage unit 701 adapted to store a mapping table in which mapping relationships between query information and guidance information are stored; an obtaining unit 702 adapted to obtain query information provided from a client; a first searching unit 703 adapted to search in a mode (1) for guidance information corresponding to the query information; a second searching unit 704 adapted to predict guidance information corresponding to the query information in a machine learning mode; a guidance information determination unit 705 adapted, if the first searching unit 703 retrieves the guidance information corresponding to the query information in the mode (1), then to determine, from the guidance information derived by the first searching unit 703 and the guidance information predicated by the second searching unit 704, guidance information to be provided to the client; and a transmission unit 706 adapted to transmit to the client the guidance information determined to be provided to the client. Particularly in the mode (1), the guided search server analyzes the query information to derive at least a model; and if a plurality of models are derived, then it calculates similarities of the respective models to represent the extents to which the models are similar to the query information, ranks the respective models in a sequential order of the similarities and searches the mapping table, in which mapping relationships between query information and guidance information are stored, for guidance information corresponding to the respective models using the models as a keyword in the order of ranking.

Since the embodiment of the guided search server illustrated in FIG. 7 corresponds to the embodiment of the method illustrated in FIG. 6, reference can be made to the relevant descriptions in the embodiment of the method illustrated in FIG. 6 for details of functions and mutual cooperative relationships of the respective units in the guided search server illustrated in FIG. 7, and repeated descriptions thereof will be omitted here.

Since the guided search server can be deployed in an information processing system, an embodiment of the invention further includes an information processing system. As illustrated in FIG. 1, the information processing system includes a client 102 and a guided search server 101, where the client 102 is adapted to perform information interaction with the guided search server 101, and the guided search server 101 is adapted to obtain query information provided from the client 102, search in mode (1) for guidance information corresponding to the query information and predict in a machine learning mode guidance information corresponding to the query information, and if the guidance information corresponding to the query information is retrieved in mode (1), then determine, from the guidance information retrieved and predicated in the two modes, guidance information to be provided to the client and transmit to the client the guidance determined to be provided to the client. Particularly in mode (1), the guided search server analyzes the query information to derive at least a model which is information extracted from the query information or information obtained by implementing the semantic translation of the query information and which characterizes the query information; and if a plurality of models are derived, then it calculates similarities of the respective models to represent the extents to which the models are similar to the query information, ranks the respective models in a sequential order of the similarities and searches a mapping table, in which mapping relationships between query information and guidance information are stored, for guidance information corresponding to the respective models using the models as a keyword in the order of ranking.

Reference can be made to the relevant descriptions in the embodiment of the method illustrated in FIG. 6 and the embodiment of the guided search server illustrated in FIG. 7 for details of specific functions and mutual cooperative relationships of the guided search server 101 and the client 102, and repeated descriptions thereof will be omitted here.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple subunits.

In summary, in the embodiments of the invention, the guided search server can analyze query information to derive at least a model after obtaining the query information provided from the client; and if a plurality of models are derived, it can calculate similarities of the respective models, rank the respective models in a sequential order of the similarities and search a mapping table, in which mapping relationships between query information and guidance information are recorded, for guidance information corresponding to the respective models using the models as a keyword. In this case, even if the query information obtained from the client is absent in the mapping table, it is still possible to retrieve appropriate guidance information due to possible presence of the model(s) in the mapping table, thus addressing the disability of the guided search server to provide the client with guidance information corresponding to query information absent in the mapping table.

Moreover, if the guided search server retrieves no guidance information corresponding to any model from the mapping table in which mapping relationships between query information and guidance information are recorded, then it can derive guidance information corresponding to the obtained query information in a machine learning mode to thereby further ensure that the guided search server can return the corresponding guidance information for the query information provided from the client.

Moreover, the guided search server can also derive guidance information corresponding to the obtained query information in a machine learning mode in addition to searching for the guidance information using the model(s) and determine guidance information to be returned to the client from the guidance information retrieved and predicated in the two modes to thereby further improve the comprehensiveness and accuracy of the guidance information returned to the client.

As can be apparent from the foregoing descriptions of the embodiments, those skilled in the art can clearly understand that the invention can be implemented in a manner of software combined with an essential general-purpose hardware platform. Based upon such understanding, the technical solutions of the invention or the part thereof contributing to the prior art can essentially be embodied in the form of a software product, which can be stored in a storage medium, e.g., an ROM/RAM, a magnetic disk, an optical disk, etc., and which includes several instructions to cause a computer device (which may be a personal computer, a server, a network device, etc.) to perform the methods according to the respective embodiments of the invention or according to some parts of the embodiments.

The respective embodiments in the specification have been progressively described and their common or similar parts can be taken for mutual reference, and each of the embodiments has placed an emphasis on its difference(s) from the other embodiment(s). Especially for the embodiments of the system, they are substantially similar to the embodiments of the method and therefore have been described briefly, and for details thereof, reference can be made to those parts of the descriptions of the embodiments of the method.

The invention can be applied in numerous general-purpose or dedicated computer system environments or configurations, e.g., a personal computer, a server computer, a handheld or portable device, a flat panel device, a multi-processor system, a microprocessor based system, a set-top box, a programmable consumer electronic device, a network PC, a miniaturized computer, a large-scale computer, a distributed computing environment including any of the foregoing system or devices, etc.

The invention can be described in a general context of computer executable instructions executed by a computer, e.g., a program module. Generally, the program module includes a routine, program, object, component, data structure, etc., which executes a specific task or embodies a specific abstract type of data. Alternatively, the invention can be implemented in a distributed computing environment in which a task is executed by remote processing devices interconnected over a communication network and in which the program module can be located in a local or remote computer storage medium including a storage device.

Although the invention has been described in connection with the embodiments thereof, those ordinarily skilled in the art shall appreciate that numerous modifications and variations of the invention are possible without departing from the spirit of the invention, it is intended to encompass these modifications and variations in the claimed scope of the invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of guided search, comprising:
receiving a new query;
processing the new query to obtain a plurality of models, wherein the obtaining of the plurality of models comprises:
identifying a central phrase comprising a plurality of words or a central word of the new query; and
wherein:
a model indicates a mapping relationship of a previously stored query and corresponding guidance information;
the model includes information extracted from the new query, information transformed based on the new query, or both; and
the model characterizes the new query;
determining a corresponding plurality of similarities of the plurality of models relative to the new query, wherein the determining of the corresponding plurality of similarities comprises:
computing a similarity of one of the models with the new query based on a property of a model word in the one of the models, a property of a skipped word in the one of the models, or a combination thereof; and
in the event that the skipped word exists, calculating a penalty score based on the skipped word in the one of the models, comprising:
determining a first penalty score of the skipped word based on a part of speech of the skipped word;
determining a second penalty score based on a distance of the skipped word relative to the central phrase in the new query;
determining a third penalty score based on a distance of the skipped word relative to the central word in the new query; and
adjusting the similarity of the one of the models with the new query based on the first, second, and third penalty scores, comprising:
weighing one of the first penalty score, second penalty score or third penalty score by a first weight to obtain a first weighted penalty score;
weighing another one of the first penalty score, second penalty score or third penalty score by a second weight to obtain a second weighted penalty score, the first weight being different from the second weight; and
adjusting the similarity of the one of the models with the new query based on the first and second weighted penalty scores;
selecting at least one of the plurality of models based at least in part on the similarities;
obtaining guidance information by using the selected model as an index to search a database comprising a plurality of mapping relationships of previously stored queries and corresponding guidance information; and sending the obtained guidance information to be displayed to a user.

2. The method of claim 1, wherein processing the new query to obtain the plurality of models further includes extracting phrases of specified lengths, the phrases comprising the central phrase or the central word.

3. The method of claim 1, wherein processing the new query to obtain the plurality of models includes skipping a plurality of words in the new query to generate the plurality of models.

4. The method of claim 1, further comprising ranking the plurality of models according to their similarities.

5. The method of claim 1, further comprising determining a corresponding plurality of confidences of the obtained guidance information relative to the selected model, and wherein obtaining the guidance information further includes selecting the at least some of the guidance information based at least in part on the confidences.

6. The method of claim 5, wherein the corresponding plurality of confidences are specified based on historical data of previously stored queries and user selected guidance information and user selected intermediate information.

7. The method of claim 5, wherein the corresponding plurality of confidences is specified based on historical data of previously stored queries and user selected guidance information and is determined based at least in part on probability values based on an occurrence rate of a previous stored query and the user selected guidance information occurring concurrently.

8. The method of claim 7, wherein the corresponding plurality of confidences is determined by:
determining a first probability based on an occurrence rate of the previously stored query and the user selected guidance information occurring concurrently given a total number of occurrences of the previously stored query;
determining a second probability based on an occurrence rate of the previously stored query and user selected intermediate information occurring concurrently given a total number of occurrences of the previously stored query;
calculating a weighted sum of the first probability and the second probability to determine the confidence.

9. The method of claim 1, further comprising predicting guidance information in a machine learning mode.

10. A system for providing guided search, comprising:
one or more processors configured to:
receive a new query;
process the new query to obtain a plurality of models, wherein the obtaining of the plurality of models comprises:
identify a central phrase comprising a plurality of words or a central word of the new query; and
wherein:
a model indicates a mapping relationship of a previously stored query and corresponding guidance information;
the model includes information is extracted from the new query, information transformed based on the new query, or both; and
the model characterizes the new query;
determine a corresponding plurality of similarities of the plurality of models relative to the new query, wherein the determining of the corresponding plurality of similarities comprises:
compute a similarity of one of the models with the new query based on a property of a model word in the one of the models, a property of a skipped word in the one of the models, or a combination thereof; and
in the event that the skipped word exists, calculate a penalty score based on the skipped word in the one of the models, comprising:
determine a first penalty score of the skipped word based on a part of speech of the skipped word;
determine a second penalty score based on a distance of the skipped word relative to the central phrase in the new query;
determine a third penalty score based on a distance of the skipped word relative to the central word in the new query; and
adjust the similarity of the one of the models with the new query based on the first, second, and third penalty scores, comprising to:
weigh one of the first penalty score, second penalty score or third penalty score by a first weight to obtain a first weighted penalty score;
weigh another one of the first penalty score, second penalty score or third penalty score by a second weight to obtain a second weighted penalty score, the first weight being different from the second weight; and
adjust the similarity of the one of the models with the new query based on the first and second weighted penalty scores;
select at least one of the plurality of models based at least in part on the similarities;
obtain guidance information by using the selected model as an index to search a database, wherein the database comprises a plurality of mapping relationships of previously stored queries and corresponding guidance information; and
send the obtained guidance information to be displayed to a user; and
one or more memories coupled to the one or more processors, configured to provide the one or more processors with instructions.

11. The system of claim 10, wherein processing the new query to obtain the plurality of models includes skipping a plurality of words in the new query to generate the plurality of models.

12. The system of claim 10, wherein obtaining the guidance information includes using a selected one of the at least some of the plurality of models as an index to search the database.

13. The system of claim 10, wherein the one or more processors are further configured to determine a corresponding plurality of confidences of the obtained guidance information to the plurality of models, and wherein obtaining the guidance information further includes selecting the at least some of the guidance information based at least in part on the confidences.

14. A computer program product for providing guided search, the computer program product being embodied in a non-transitory computer readable storage medium and comprising computer instructions for:
receiving a new query;
processing the new query to obtain a plurality of models, wherein the obtaining of the plurality of models comprises:
identifying a central phrase comprising a plurality of words or a central word of the new query; and wherein:
  a model indicates a mapping relationship of a previously stored query and corresponding guidance information;
  the model includes information is extracted from the new query, information transformed based on the new query, or both; and
  the model characterizes the new query;
determining a corresponding plurality of similarities of the plurality of models relative to the new query, wherein the determining of the corresponding plurality of similarities comprises:
  computing a similarity of one of the models with the new query based on a property of a model word in the one of the models, a property of a skipped word in the one of the models, or a combination thereof; and
  in the event that the skipped word exists, calculating a penalty score based on the skipped word in the one of the models, comprising:
    determining a first penalty score of the skipped word based on a part of speech of the skipped word;
    determining a second penalty score based on a distance of the skipped word relative to the central phrase in the new query;
    determining a third penalty score based on a distance of the skipped word relative to the central word in the new query; and
    adjusting the similarity of the one of the models with the new query based on the first, second, and third penalty scores; comprising:
      weighing one of the first penalty score, second penalty score or third penalty score by a first weight to obtain a first weighted penalty score;
      weighing another one of the first penalty score, second penalty score or third penalty score by a second weight to obtain a second weighted penalty score, the first weight being different from the second weight; and
      adjusting the similarity of the one of the models with the new query based on the first and second weighted penalty scores;
  selecting at least one of the plurality of models based at least in part on the similarities;
  obtaining guidance information by using the selected model as an index to search the database, wherein the database comprises a plurality of mapping relationships of previously stored queries and corresponding guidance information; and
  sending the obtained guidance information to be displayed to a user.

15. The method of claim 1, wherein the obtaining of the model comprises performing an N-gram technique or a Skip-Gram technique on the new query.

16. The method of claim 1:
  wherein the part of speech is adverb, adjective, numeral, verb, or noun.

17. The method of claim 1, wherein:
  the one penalty score corresponds to the third penalty score;
  the other penalty score corresponds to the second penalty score; and
  the first weight is greater than the second weight.

* * * * *